A. R. McKINNEY.
INTERMEDIATE CHUCK JAW.
APPLICATION FILED DEC. 24, 1914.
1,161,490.
Patented Nov. 23, 1915.
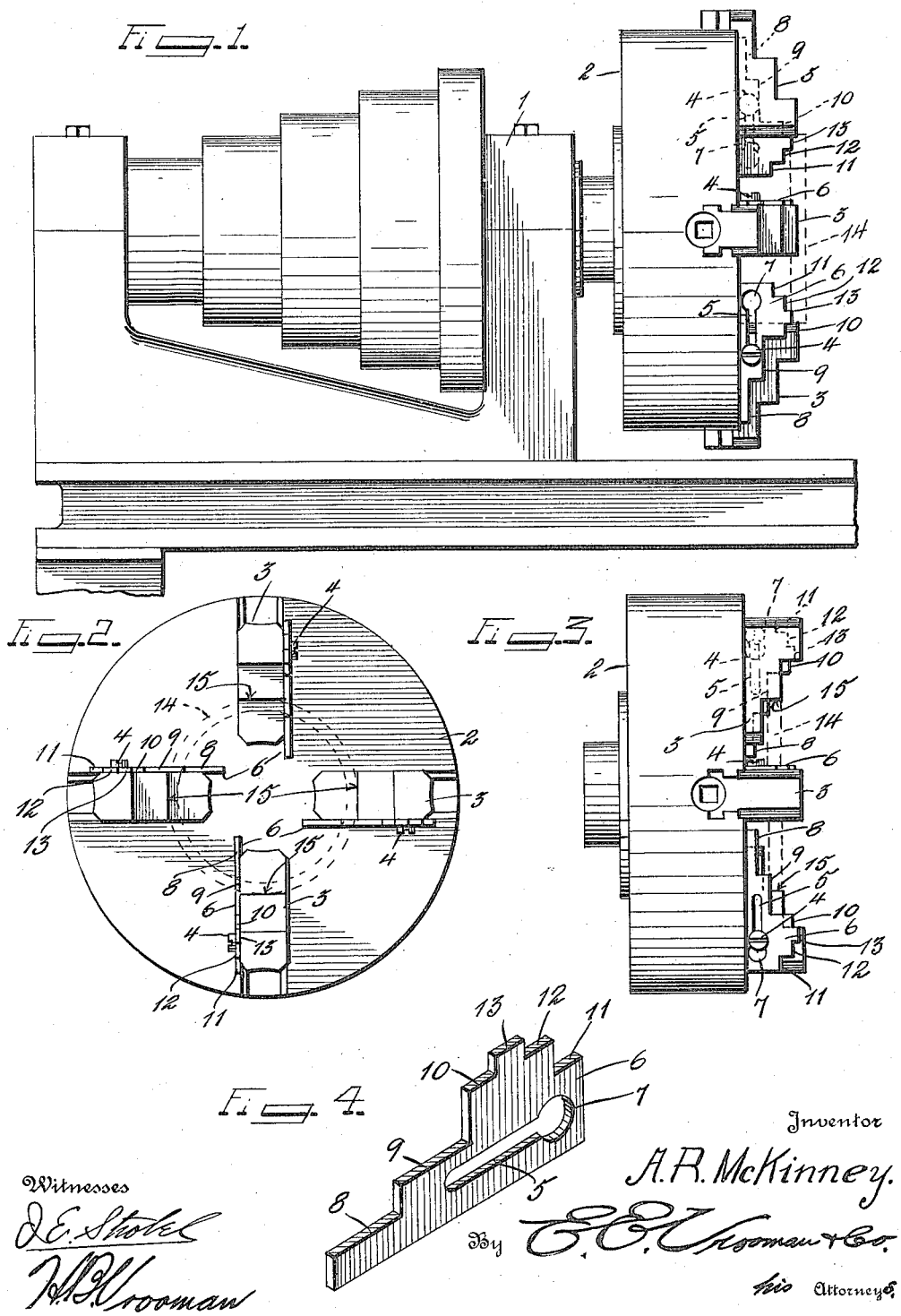

200
UNITED STATES PATENT OFFICE.

ALBERT R. McKINNEY, OF BRISTOL, VIRGINIA.

INTERMEDIATE CHUCK-JAW.

1,161,490.  Specification of Letters Patent.  Patented Nov. 23, 1915.

Application filed December 24, 1914. Serial No. 878,895.

*To all whom it may concern:*

Be it known that I, ALBERT R. McKINNEY, a citizen of the United States of America, residing at Bristol, in the county of Washington and State of Virginia, have invented certain new and useful Improvements in Intermediate Chuck-Jaws, of which the following is a specification, reference being had therein to the accompanying drawing.

This invention relates to an intermediate chuck jaw and has for its object the production of a simple and efficient adjustable intermediate chuck jaw which will enable an operator to secure a shallow step upon which to place the back face of the work upon which he is working. This will permit the work when chucked and faced on the front side thereof to have a uniform thickness throughout.

A still further object of this invention is the production of a simple and efficient adjustable jaw which may be applied to the chuck jaws now in use.

With these and other objects in view this invention consists of certain novel combinations, constructions, and arrangements of parts as will be hereinafter fully described and claimed.

In the accompanying drawings:—Figure 1 is a side elevation of the device applied to a chuck head mounted upon the head stock of a lathe. Fig. 2 is a front elevation of the chuck head showing the device applied thereto. Fig. 3 is a side elevation of the chuck head showing the intermediate chuck jaw arranged in a different position from that shown in Fig. 1. Fig. 4 is a detail perspective of the intermediate chuck jaw plate.

By referring to the drawings it will be seen that 1 designates the head stock of the lathe which carries the chuck 2. A plurality of chuck jaws 3 are adjustably mounted upon the chuck 2 in the usual manner, and each of these chuck jaws carries a threaded pin or screw 4, which screw 4 is adapted to work in the longitudinally extending slot 5 of the adjustable chuck jaw plate 6. This slot 5 is provided with an enlarged circular opening 7 at the rear end thereof for the purpose of facilitating the fitting of the plate 6 over the head of the screw or pin 4. The plate 6 is provided with an elongated front tongue 8 and an intermediate step portion 9, and also an upper front step portion 10. The plate is also provided with a lower rear step portion 11, and an upper rear step portion 12. An upwardly extending tongue 13 is formed intermediate the front and rear step portions as illustrated in Fig. 4.

As illustrated in Figs. 1 and 3 it will be seen that the intermediate chuck plate 6 is capable of being adjusted in a desired position with respect to the chuck jaws 3, the step portions formed upon the plate 6 being arranged at a different height with respect to the step portions formed upon the chuck jaws 3, or in other words approximately one-half the distance of the height of the chuck jaws 3. This structure is clearly illustrated in Figs. 1 and 3.

It should be understood that the present device is especially adapted to be used for supporting shallow disks, rings and the like, such as illustrated in dotted lines and indicated by the numeral 14 in the drawings, and it should be understood that the edge of the ring is adapted to rest against the shoulders 15 of the chuck jaws 3, the back face of the disk 14 being adapted to rest upon the upper face of one of the step portions 8, 9, 10, 11 or 12 for the purpose of supporting the shallow disk or ring 14 in the desired position in order that a uniform thickness may be produced upon the ring when the outer or front face has been dressed.

Having thus described the invention what is claimed as new, is:—

1. As a new article of manufacture, an adjustable chuck jaw plate comprising an elongated body, said body provided with an elongated slot extending longitudinally thereof terminating in an enlarged circular pocket at one end thereof, said slot adapted to receive a securing means for attaching said intermediate chuck jaw plate to a support, and said intermediate chuck jaw plate provided with a plurality of forward and rear intermediate step portions for facilitating the supporting of a shallow disk upon a chuck head when said intermediate chuck jaw plate is applied to an adjustable chuck jaw carried by a chuck head.

2. In a device of the class described, the combination with a chuck head, a plurality of adjustable chuck jaws carried thereby, of an intermediate chuck jaw plate carried by each chuck jaw, each plate provided with an elongated longitudinally extending slot, a threaded pin passing through said slot for holding said chuck jaw plate in an adjusted position, each chuck jaw plate provided with a plurality of step portions formed thereon, each chuck jaw provided with a plurality of step portions formed thereon, and the corresponding step portions of said adjustable chuck jaw plate being formed of an intermediate height relative to the step portions of said chuck jaws.

3. In combination with a chuck jaw, said chuck jaw provided with a plurality of step portions, of an intermediate adjustable chuck jaw plate secured to the side of said chuck jaw and provided with intermediate step portions thereon, whereby said intermediate chuck jaw plate may support a piece of work in an intermediate position with respect to said chuck jaw.

4. In combination with a chuck jaw, of an adjustable chuck jaw plate comprising a flat body, said chuck jaw provided with step portions formed thereon, said adjustable chuck jaw plate provided with a plurality of intermediate step portions formed thereon arranged at intermediate heights with respect to the step portions of said chuck jaw for facilitating the supporting of a piece of work in an intermediate position with respect to the step portions of said chuck jaw.

5. In combination with a chuck jaw, of an adjustable chuck jaw plate comprising an elongated flat body provided with a plurality of intermediate step portions formed upon the outer face thereof, said chuck jaw provided with a plurality of step portions formed upon the outer face thereof, the step portions of said adjustable chuck jaw plate being formed at an intermediate point with respect to the step portions of said chuck jaw, and means for facilitating the locking of said adjustable chuck jaw plate in a set position with respect to said chuck jaw.

In testimony whereof I hereunto affix my signature in presence of two witnesses.

ALBERT R. McKINNEY.

Witnesses:
J. G. TILLEY,
JAMES L. DAVIS.

Copies of this patent may be obtained for five cents each, by addressing the "Commissioner of Patents, Washington, D. C."